United States Patent Office 3,662,025
Patented May 9, 1972

3,662,025
POLYMERIZABLE RESINOUS BLEND OF UNSATURATED POLYESTER RESIN AND POLYMERIZABLE MONOMER AND METHOD OF PREPARING THE SAME
Donald A. Buck, New City, N.Y., assignor to Reichhold Chemicals, Inc., White Plains, N.Y.
No Drawing. Filed Oct. 20, 1970, Ser. No. 82,545
Int. Cl. C08f 21/00, 21/02
U.S. Cl. 260—863                                 13 Claims

ABSTRACT OF THE DISCLOSURE

Polymerizable blend comprising (1) an unsaturated polyester resin prepared from (A) an alpha-beta-ethylenically unsaturated dicarboxylic acid or acid anhydride and (B) an excess of a polyhydric alcohol which is then reacted at a temperature ranging from about 150° C. to about 200° C. with (C) a phosphonate intermediate which is the reaction product of a phosphonate and an organic hydroxy acid or a lactone at a temperature ranging from about 110° C. to about 80° C. in the presence of a catalyst and (2) a polymerizable monomer containing a $CH_2$=CH group, said polymerizable resin blend possessing excellent flame-retardant properties, being very light in color, having long storage life and outstanding resistance to UV degradation, and method of making same.

---

The invention relates to polymerizable resinous blend of unsaturated polyester resin and polymerizable monomer and method of preparing same, and more particularly to a polymerizable blend comprising (1) an unsaturated polyester resin prepared from (A) an alpha-beta-ethylenically unsaturated dicarboxylic acid or acid anhydride and (B) an excess of a polyhydric alcohol which is then reacted at a temperature ranging from about 150° C. to about 200° C. with (C) a phosphonate intermediate which is the reaction product of a phosphonate and an organic hydroxy acid or a lactone at a temperature ranging from about 110° C. to about 80° C. in the presence of a catalyst and (2) a polymerizable monomer containing a $CH_2$=CH group, said polymerizable resin blend possessing excellent flame-retardant properties, being very light in color, having long storage life and outstanding resistance to UV degradation, and method of making same.

Resin compositions prepared by the method of this invention are suitable for a wide variety of uses in the plastics field. These resins have all the favorable properties normally associated with a polyester resin, that is toughness, strength, general lack of deterioration and, in addition, are flame-resistant and self-extinguishing. Products made from these resin compositions are suitable for both indoors and outdoors.

Polyester resins which achieve self-extinguishing properties by virtue of incorporating the phosphono moiety in the resin as a chain terminating group, have been known for many years. (Carson et al. U.S. Pat. 3,150,208). However, these methods suffer from the fact that the reaction between the polyester and the phosphonate proceeds at a slow rate requiring lengthy periods of high temperature to drive the reaction to completion. This results in disproportionation and degradation of the phosphorus intermediate with subsequently poor initial color and stability of the final product.

It is also known that some flame-retardant properties may be gained by mixing phosphorus containing compounds, such as phosphonates, phosphates and phosphites with polyesters to be compounded into finished compositions.

However, such a composition generally yields finished products which are weak and soft. Also, the phosphorus containing compounds tend to come to the surface of the product and to be leached out by water with a resulting loss in flame-retardant properties.

Polyester resin compositions in which phosphonate groups are incorporated into the polyester molecular structure, other than at terminal positions, are also known. These resin compositions, when cured, also yield a product which is soft and low in strength and toughness and loses its flame-retardant properties over a period of time when exposed to moisture.

It is, therefore, an object of this invention to prepare a polymerizable unsaturated polyester resin blend that, when cured, will have none of the foregoing objectionable characteristics.

It is also an object of this invention to prepare a polymerizable unsaturated polyester resin blend which has excellent flame-retardant properties and is non-burning.

Another object of this invention is to prepare a polymerizable unsaturated polyester resin blend which does not have said flame-retardant properties effected by exposure to water.

Still another object of this invention is to prepare a polymerizable unsaturated polyester resin blend which when cured is hard, tough and strong.

Yet another object of this invention is to prepare a polymerizable unsaturated polyester resin blend which has a phosphonate moiety as a chain terminator.

Another object of this invention is to prepare a polymerizable unsaturated polyester resin blend which is easy to prepare, has a light color and is stable over long periods of time.

Other objects of this invention will become apparent as this description proceeds.

Surprisingly, it has now been found that these and other objects can be achieved by first reacting a phosphonate compound with an organic hydroxy-acid or lactone and then reacting the resultant intermediate product with an unsaturated polyester resin to yield an unsaturated polyester resin having phosphonate groups at terminal positions only.

By this method the configuration of the phosphorus bearing moiety is modified, prior to reaction with the polyester in such a way that it is carboxy terminated. It appears that greater amendability of the hydroxy-carboxy reaction contributes to greater speed and facility of the phosphonation reaction resulting in greatly improved color, stability and economics of the final resin product.

Resins of this type are characterized by good flame retardancy combined with excellent weatherability and superior resistance to color degradation by ultra violet radiation.

Another important aspect of this improved process, which is a significant factor in improved storage stability of the final resin product, is the observation of the profound effect that free phosphonic acids have on promoting premature gelation of the resin system.

The promoting action is apparent in the data of Table I, appearing hereinafter, which were determined by adding various percentages of benzene phosphonic acid to a general purpose phthalic anhydride/maleic anhydride/propylene glycol polyester resin of medium reactivity and evaluating the promoting effect by means of a standard SPI gel test run at 150° C. bath temperature.

I can be seen from these tabulated data that increments of phosphonic acid, up to 0.5%, had a pronounced effect on decreasing the gel and cure time, whereas above that level further additions had no appreciable influence.

This action was hypothesized to be the process responsible for the short storage stability of the prior art phosphonate terminated resin, since those resins which had a low initial acid value (ca. 12) showed a gradual increase in acid value on standing with a rapid decrease in storage stability. It is presumed that residual traces of moisture, coupled with a small amount of continued disproportionation, causes a generation of free phosphonic acid groups which effectively promote the resin system and thereby create an abbreviated shelf life.

By our technique, the phosphonation step is continued until the acid value of the neat resin has increased to 70–75 before terminating the reaction. By carrying the acid value to this point, we insure that the free phosphonic acid group concentration exceeds the critical 0.5% level. Resins prepared in this manner were still stable after 2 years storage at room temperature whereas equivalent resins of low acid value were gelled in two or three months.

A typical example of the practice of this invention is as follows: A polymerizable unsaturated polyester resin is prepared by known techniques from a dicarboxylic acid or acid anhydride and a polyhydric alcohol, using an excess of alcohol so as to yield a predominantly hydroxyl terminated resin. The modified phosphonate moiety, hereafter to be referred to as the "phosphonate intermediate," is prepared by adding to a phosphonate, in the presence of a selected catalyst, and an inert gas atmosphere, at a temperature ranging from about 110° C. to about 180° C., an organic hydroxy acid or a lactone. When this reaction is complete the phosphonate intermediate and the unsaturated polyester resin are reacted, at a temperature ranging from about 150° C. to about 190° C., in the presence of an inert gas atmosphere, until the hydroxyl value is essentially zero and the acid number has increased to about 60–80. This reaction product is now mixed with a copolymerizable monomer to form a finished polymerizable, unsaturated polyester resin blend which may be cured by any of several methods well known in the art. This resin composition may be used alone or further compounded with filler, pigments, etc.

The following detailed description is intended to illustrate this invention more fully but not to limit it in its scope.

The term "unsaturated polyester resin" as used generally herein is intended to include within its meaning condensation products that are obtained from alpha,beta-ethylenically unsaturated dicarboxylic acids and/or their anhydrides by esterification carried out with a molar excess of polyhydric alcohols. As alpha-beta-unsaturated dicarboxylic acids may be used, for example, maleic acid anhydride, fumaric, itaconic, citraconic, mesaconic and aconic acids and the like, and mixtures thereof.

A part of the alpha-beta unsaturated dicarboxylic acids may be replaced, in a known manner, with saturated dicarboxylic acids such as o- and isophthalic acid, tetra- and hexahydrophthalic acid, tetra-chlorophthalic acid, hexachloroendo - methylene - tetra - hydrophthalic acid, endomethylene-tetrahydrophthalic acid, adipic and sebacic acid, as well as, dimerized linseed oil and soy bean oil fatty acids, or their anhydrides and the like, and mixtures thereof.

As polyhydric alcohols there may be used, for example, dihydric alcohols, such as ethylene glycol, propanediol-1,2, butanediol-1,4-diethylene glycol, dipropylene glycol and their higher homologues, neopentyl glycol, 2,2,4-trimethylpentanediol-1,3, pentyl glycol, oxyalkylated bisphenols, hydrogenated bisphenols, dimethylolcyclohexane and mixtures thereof. However, it is also possible to use, together with these, tri- and polyhydric alcohols such as glycerin, trimethylolethane, trimethylolpropane as well as a pentaerythrite and mixtures thereof. An excess, ranging from about 20% to 50% of the alcohol is used with 25% excess being desirable. Further modifications of the properties of the polyester resins can be obtained by the addition of monofunctional compounds during the esterification, for example, by the addition of fatty acids having 8 to 22 carbon atoms, benzoic acid, resinic acids, partially hydrogenated resinic acids, such as abietic acid and/or dihydro- or tetrahydro-abietic acid, monohydric n- and isoalcohols having 4 to 12 carbon atoms, benzyl alcohol, resin alcohols, as for example abietyl alcohol and the like, and mixtures thereof.

The esterification of the foregoing described compounds is carried out, in a known manner, until a low acid number of less than 4 is obtained and the Gardner-Holdt viscosity for a 70% solution of the resin in styrene is N—O. The number average molecular weight ranges from about 1100 to 1300.

Phosphonates suitable for use in this invention are those having the general formula:

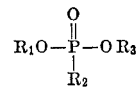

$R_1$, $R_2$ and $R_3$ are at least one member selected from the group consisting of alkyl, phenyl, alkaryl, aralkyl and alkenyl and wherein the number of carbons in the aliphatic chain ranges from one to four. These groups may be substituted if so desired. Examples of acceptable phosphonates include: diphenyl benzenephosphonate, dimethyl methoxymethanephosphonate, diethyl chloromethanephosphonate, diisopropyl ethanephosphonate, diisopropyl p-toluenephosphonate, dimethyl 2-propenephosphonate, dimethyl methanephosphonate, diethyl ethanephosphonate, diethyl methanephosphonate, dimethyl ethanephosphonate, dipropyl butanephosphonate, dimethyl phenylmethanephosphonate, diisobutyl benzenephosphonate and the like and mixtures thereof. For the purpose of this disclosure the word "phosphonate" is meant to include the above.

The phosphonate is reacted with either an organic hydroxy acid, or preferably, a lactone. Organic hydroxy acids which are suitable for the purpose of this invention may contain up to five carbon atoms as for example glycolic acid, (+)-lactic, (±)-lactic, (±)-alpha-hydroxybutyric. Representative lactones which are suitable for the practice of this invention may contain up to five carbons as for example, beta-propiolactone, alpha-valerolactone, gamma - valerolactone, alpha - butyrolactone, angelica-lactone and the like and mixtures thereof. The phosphonate and the organic hydroxy-acid or lactone are generally employed at a mole ratio of 1:1 and the temperature of this reaction may range from about 110° C. to about 180° C. with a range of about 170° C. to about 175° C. preferred because of the minimum time need for the reaction coupled with the production of a light colored product. A catalyst may be employed to facilitate reaction. Said catalyst may be used in a ratio ranging from about 0.05% to about 0.5% based upon the total weight of the reactants used. The preferred ratio of catalyst is about 0.2% based upon the total weight of the reactants used. Catalysts which are useful in the practice of this invention are metal oxide types and organic tin compounds as for instance, lead oxide, calcium oxide, dibutyltin oxide, dibutyltin acetate, and the various other organic tin oxide compounds, zinc oxide, antimony oxide and the like and mixtures thereof. A synergist may be added as, for instance, zinc acetate and the like. However, the preferred catalyst is a mixture of equal proportions by weight of zinc acetate and antimony oxide. Said catalyst provides rapid action at low temperatures and yields a very light colored product.

The time needed for the phosphonate to hydroxy acid-lactone reaction varies with the particular hydroxy acid or lactone employed, that is, from about 5 to 6 hours to about 10 to 12 hours.

This reaction may be carried out under an inert atmosphere consisting of nitrogen, carbon dioxide and helium and the like and mixtures thereof.

A preferred practice for the preparation of the phosphonate intermediate is as follows: A reaction vessel is charged with dimethyl methane phosphonate and heated to 100° C., with stirring, at which time the zinc acetate-antimony oxide catalyst is added. The temperature is raised to 150° C., heating is stopped, and a feed of beta-propiolactone is started. Addition rate is adjusted so that the resulting exotherm maintains the reaction temperature at about 150° C. to 160° C. When the addition is completed, the temperature is increased to 175° C., by heating, and maintained until the milky reaction mixture becomes almost clear. The reaction is then terminated after a total reaction time of 10 to 12 hours, and the resulting product is nearly water white in color. Now the phosphonate-intermediate which is carboxy terminated, is ready to be reacted with the polyester resin which is hydroxy terminated. This unsaturated polyester resin is charged into a reaction flask with an inert gas sparge, heated to a temperature ranging from about 150° C. to about 190° C. and the phosphonate intermediate is added with stirring. Reaction is continued until the hydroxy value has decreased to essentially zero and the acid number of the neat resin has increased to about 70 to 75 and the Gardner-Holdt viscosity of a 70% resin solution in 70/30, styrene/methyl methacrylate mixture is O to P. At this point, the reaction is terminated and the phosphonate terminated unsaturated polyester is ready to be blended with a polymerizable monomer to form the finished polymerizable, unsaturated resin blend.

As the copolymerizable monomeric compounds, it is possible to use in these mixtures, according to the present invention, monomers containing a $CH_2=C$ group. Suitable terminal ethylenic monomers are: styrene, vinyl toluene, di-vinyl benzene, methylacrylate, ethyl, n-butyl, and 2-ethylhexyl methacrylates, ethylacrylate, n-butylacrylate, 2-ethylhexylacrylate, methylmethacrylate, ethylene glycol-dimethacrylate and its higher homologues such as diethylene glycol-dimethacrylate, trimethylolpropane-trimethacrylate, diallyl-phthalate, diallyl maleinate, diallyl fumarate, triallylcyanurate, vinyl acetate and vinyl propionate and mixtures thereof.

These mixtures may range from 10:90 to 90:10. However, when using a styrene/methyl methacrylate mixture the desired proportion preferably ranges from about 40:60 and 90–10 with a 70–30 mixture yielding superior results.

To insure a sufficient stability during storage or to secure longer workability of the mixture, it is desirable to add inhibitors during the preparation of the mixture of unsaturated polyester and copolymerizable monomeric compound. As an inhibitor, it is suitable to use, for example, benzoquinone, hydroquinone, 1,4-naphthoquinone, 2,5-diphenyl-p-benzoquinone and p-tert-butylpyrocatechol and the like and mixtures thereof.

The liquid polymerizable polyester resin blend is now ready to be used either by itself, or, if so desired, compounded with additional components.

The polymerizable blend may then contain as additional conventional components fillers, such as talcum, clays, carbonates, asbestos powder and fiber, quartz powder, chalk, dolomite, kieselguhr, heavy spar, and reinforcing fillers such as glass fibers in their various forms, and mixtures thereof.

For coloring the blend, dyes and/or inorganic pigments may be used. For this purpose, fundamentally all the compounds commonly used in the lacquer and plastics industry are suitable in that they have not detrimental effect on the storage stability of the present mixtures, i.e. initiate a premature polymerization between the unsaturated polyester resin and the polymerizable monomeric compound.

Illustrative pigments suitable for this purpose are set forth for example in Organic Protective Coatings, Reinhold Publishing Corporation, 1953, pages 155 to 166 inclusive.

Suitable release agents or lubricants and polymerization catalysts and promoters can be added to the blend, these being well known to those skilled in the art, and described for example in Polymer Processes by Calvin E. Schildknecht, vol. X, Interscience Publishers Inc. (1956).

The thus prepared polymerizable liquid polyester resin blend with or without any of the foregoing additives may be cured in any of the methods widely employed for this purpose.

As previously disclosed, the polyester phosphonate terminated resin blends of this invention have exceptionally light color, are stable over long periods of time, have excellent flame-retardancy properties, are non-burning and have superior resistance color degradation by ultra-violet radiation.

The following examples are representative of this invention but by no means limiting it in its spirit or scope.

EXAMPLE I

Preparation of a polymerizable polyester

To a reaction flask provided with stirrer, vacuum hook up, inert gas sparge, heating mantle and distillation apparatus is charged 1437.5 grams ethylene glycol, 975.0 grams maleic anhydride, 1120.0 grams phthalic anhydride and 121.5 grams benzoic acid. The content was heated, with agitation and with an inert gas sparge to about 200° C. and maintained at this temperature until the acid value was less than 4 and the Gardner-Holdt visoscity for a 70% solution of the resin in styrene was N to O. The number average molecular weight of the neat resin was 1150. To the cooled resin was added 0.01% hydroquinone as an inhibitor.

EXAMPLE II

Preparation of a phosphonate intermediate

A reaction flask equipped with a stirrer, inert gas sparge, vacuum hook up, heating mantle, and distillation apparatus was charged with 1250 grams of 70% glycolic acid. The temperature was raised to 100° C. with stirring and vacuum to remove the 30% water of solution. When the calculated amount of water was removed, vacuum was discontinued and 1430 grams of dimethyl methane phosphonate, 0.225 gram zinc acetate and 0.225 gram antimony oxide were added and the temperature was raised to 175° C. with nitrogen sparge. These conditions are maintained until distillation ceased, about 10 to 12 hours, at which point the reaction was complete. The product was a slightly viscous straw colored liquid. This phosphonate intermediate, and all those which are prepared with a hydroxy acid, is used in a ratio ranging from about 21–22% based upon the weight of the polyester used. The percentage may vary from about 20% to 50% or 60% or higher. However, at a 20% phosphonate intermediate level the flame-retardant properties are lost and the use of over 22% does not add to the performane of the finished resin, and indeed, if too much phosphonate intermediate is used the physical properties will suffer.

EXAMPLE III

A phosphonate intermediate was prepared in the manner according to Example II except that the phosphonate was diethyl ethane phosphonate.

EXAMPLE IV

Preparation of a phosphonate intermediate

A reaction flask equipped as described in Example II was charged with 2846.0 grams of dimethyl methane phosphonate and heated with agitation to 100° C. at which point, 4.5 grams zinc acetate and 4.5 grams antimony oxide were added. The temperature was raised to 150° C., heating was discontinued and a continuous feed of 1654.0 grams of beta-propiolactone was adjusted so that the exotherm which developed maintained the reaction at a temperature of between 150° C. to 160° C. After the addition was completed, the temperature was increased to about 175° C. and held there until the milky reaction mixture became essentially clear. The reaction was then allowed to cool, having taken a total of about 5 to 6 hours to bring to completion. The liquid product was nearly water white in color bearing a faint haziness but upon standing at room temperature a minute crystallization occured. Homogeneity was easily restored by heating to 50° C. with agitation.

The ratio of this phosphonate intermediate, and all those phosphonate interemdiates prepared with a lactone, to polyester resin, ranges from about 29% to 30% based upon the weight of the polyester resin used. Again, this ratio may vary from about 27% to 50% or 69% or even higher. However, below a 27% phosphonate intermediate level the flame-retardant properties are lost while the use of over 29% to 30% does not add to the performance of the resin and, indeed, if too much phosphonate intermediate is used physical properties will suffer.

EXAMPLE V

Example IV was repeated except that the phosphonate used was diethyl ethanephosphonate.

EXAMPLE VI

Preparation of polymerizable, unsaturated polyester resin blend

To a reaction flask fitted with a stirrer, inert gas sparge, heating mantle and distillation apparatus was charged 325 grams of polyester resin prepared according to Example I. This was heated, with stirring and inert gas sparge to about 150° C. and 70 grams of the phosphonate intermediate, prepared according to Example II was added. Temperature was then raised to about 190° C. and these conditions were held until the hydroxy value, as determined by standard acetylation techniques, was about zero. The reaction was continued until the acid value of the neat resin increased to 70 to 75 and a 70% solution of resin in styrene showed a Gardner-Holdt viscosity of O-P, with a total time for the reaction of about 16 hours and 45 minutes.

Additional catalyst was found to be unnecessary since the amount already carried in the phosphonate intermediate was adequate for satisfactory rates in this step of the preparation.

Sixty-eight parts of the polyester thus prepared was blended with thirty-two parts of a 70/30 mixture of styrene and methyl methacrylate. Cured specimens were prepared for determination of physical properties and flammability with the pertinent test results given in Tables II and III appearing on the following pages.

EXAMPLE VII

Example VI is repeated except that the phosphonate intermediate used was prepared according to Example III.

EXAMPLE VIII

Preparation of a polymerization unsaturated polyester resin blend

To the reaction apparatus as described in Example VI was added 566 grams of the unsaturated polyester prepared according to Example I. The temperature was raised to 150° C. and 163 grams of a phosphonate intermediate prepared according to Example IV was added. Temperature was increased to 190° C. with agitation and inert gas sparge and maintained until the hydroxyl value was about zero. Reaction was further continued until the acid value of the neat resin increased to 70-75 and the Gardner-Holdt viscosity of a 70% resin solution in a 70/30 mixture of styrene/methyl methacrylate O-P. Total reaction time was about 10 hours.

Additional catalyst was found to be unnecessary since the amount already carried in the phosphonate intermediate was adequate for satisfactory rates in this step of the preparation.

Sixty-eight parts of the polyester thus prepared was blended with thirty-two parts of a 70/30 mixture of styrene and methyl methacrylate. Cured specimens were prepared for determination of physical properties and flammability with the pertinent test results given in Tables II and III appearing hereinafter.

EXAMPLE IX

Example VIII was repeated using as the phosphonate intermediate the one prepared according to Example IV.

EXAMPLE X

To a reaction apparatus set up as heretofore described was added 310 grams of the unsaturated polyester resin as prepared according to Example I, 0.59 gram dibutyltin oxide catalyst and 68 grams dimethyl methanephosphonate. The temperature was raised to 200° C. with stirring and inert gas sparged until the hydroxy value was about zero and an acid value of 26 reached. A 70% solution of the resin in a 50/50 mixture of styrene and methyl methacrylate had a viscosity of S on the Gardner-Holdt scale.

The finished resin was then blended with 50/50 methylmethacrylate to a non-volatile content of 66%. Cured specimens were prepared for determination of physical properties and flammability tests. The testing results are recorded in Tables II, III and IV.

Table II compares some of the physical properties of the resin blends prepared according to Examples VI, VII and X. The term HDT ° C stands for heat distortion temperature expressed in degrees centigrade. As can be seen the physical properties of resins prepared according to Examples VI and VIII compare quite favorably with a resin prepared by prior art methods, e.g. Example X.

In Table III, great differences become apparent. Comparing resins from Examples VIII and X can be seen that the acid number for resin VIII is much higher than for resin X. This contributes to the greater stability of the resins of this invention. Another important point is the APHA color. For resin VIII it is very low (90–100) while in resin X it is twice as high (180–200). This is of great value when these resins are used in an application wherein color of the finished product is crucial. Thus using resin blends of this invention, a finished product having a light color shade can be obtained.

Table IV shows the results of the various ASTM tests for flammability to which these resin blends were subjected. The resin blend prepared according to the preferred practice of this invention, Example VIII, has a 45 rating on the ASTM–E84–61 test. This places it in the fire-retardant range whereas the resin prepared according to Example X, has a 55 rating on the ASTM–E84–61 test. This rating places this resin composition blend in the slow burning range.

Table V demonstrates the superior performance of the instant invention resin composition in U.V. stability. Not only is the initial yellowness reading better, an 8.15 as compared to a 14.5, but, after 3,000 hours exposure, the resin from Example VIII has a reading of only 17.1 whereas the resin from Example X has a reading of 28.8. It is quite evident from this that finished products prepared from the resins of this invention will resist color change much better than comparable resins.

In Table VI, the results of accelerated storage tests are shown. Samples of the resin blend prepared according to Example VIII are compared to a resin composition prepared according to Example X. The tests were run at 55° C. in an air oven.

TABLE I
Promoting action of benzene phosphonic acid on standard DA/MA/PG polyester resin of medium reactivity

| | Resin/BPO*/Styrene/MeKO₂** 100/0.5/0.5/1.0 | | | | | Resin/BPO/Styrene/MeKO₂ 100/0.2/0.2/0.25 | | | | |
|---|---|---|---|---|---|---|---|---|---|---|
| Benzene phophonic acid percent on resin | 0 | 0.10 | .0525 | 0.5 | 1.00 | 0 | 0.10 | 0.25 | 0.50 | 1.00 |
| Gel time at 150° F | 16'30" | 14'00" | 12'50" | 12'40" | 11'30" | 34'05" | 24'25" | 23'05" | 23'10" | 22'05" |
| Cure time at 150° F | 12'30" | 7'55" | 4'35" | 4'40" | 4'55" | 20'00" | 10'25" | 6'20" | 7'00" | 5'45" |

*BPO=Benzoyl peroxide.  **MeKO₂=Methyl ethyl ketone peroxide.

TABLE II
Physical properties ⅛" clear resin plate casting

| Resin from example | VI | VIII | X |
|---|---|---|---|
| HDT (° C.) | 58 | 56 | 57 |
| Tensile (p.s.i. yield) | 11,050 | 9,061 | 11,500 |
| Flexural strength (p.s.i.) | 18,500 | 18,700 | 17,600 |
| Flexural modulus (p.s.i.×10⁵) | 4.85 | 4.80 | 4.56 |

TABLE III
Liquid Resin Properties

| Resin from example | VI | VIII | X |
|---|---|---|---|
| Non-volatile (percent) | 67.2 | 68.5 | 66.0 |
| Acid Number | 40.0 | 52.5 | 17.0 |
| Viscosity cps | 480.0 | 450.0 | 500.0 |
| Color APHA | 150-170 | 90-100 | 180-200 |
| Phosphonation reaction (to zero OH value) hrs. (min.) | 16(45) | 10 | 19 (20) |

TABLE IV
Flammability tests

| Resin from example | VI | VII | X |
|---|---|---|---|
| ASTM-D-757-65 "Globar" | <0.1"/min | <0.1"/min | <0.1"/min |
| ASTM-D-635-58 | Non-burning. | Non-burning. | Non-burning. |
| ASTM-E-84 (tunnel test) 8 oz./ft.² glass mat reinforced laminates | 55 | 45 | 55. |

TABLE V
Color stability of mat laminates [1]

| | Yellowness | |
|---|---|---|
| Resin from Example | VIII | X |
| Control (unexposed) | 8.15 | 14.5 |
| 3,000 hrs. (WOM) | 17.10 | 28,8 |

[1] Fiberglass mat laminates 0.065" exposed 3,000 hours in xenon are WOM (Atlas 60W) ASTM-E 239. Yellowness determined by tristimulus reflectance (Photovolt) over white background. Both samples contain 0.4 phr. substituted benzotriazole U.V. absorber.

TABLE VI
Gell test at 55° C.

| Resin from Example | VIII | X |
|---|---|---|
| Number of days until gelled | 186 | 11 |

As can easily be seen the storage stability of instant resin blends are far superior to what is now practiced.

What is claimed is:

1. A polymerizable blend comprising (1) an unsaturated polyester and (2) an ethylenically unsaturated monomer having the terminal CH₂=C< group; said (1) being prepared by reacting (a) an alpha, beta-ethylenically unsaturated dicarboxylic acid or acid anhydride and (b) a polyhdyric alcohol to yield a predominantly hydroxyl terminated resin which is then reacted with (c) a phosphonate intermediate which is the reaction product of a phosphonate and an organic hydroxy acid or a lactone to yield said (1) which has terminal groups (A) of the formula:

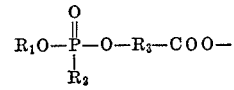

wherein R₁, R₂ and R₃ are at least one member selected from the group consisting of alkyl, aralkyl, alkaryl, alkenyl and phenyl; said alkyl, aralkyl, alkaryl and alkenyl having from one to five carbon atoms in their chain.

2. A polymerizable blend according to claim 1 wherein said phosphonate intermediate is prepared by reacting (1) a phosphonate having the formula:

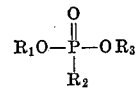

wherein R₁, R₂ and R₃ are at least one member selected from the group consisting of alkyl, aralkyl, alkaryl, alkenyl and phenyl; said alkyl, aralkyl, alkaryl and alkenyl having from one to five carbon atoms in the chain and (2) at least one member selected from the group consisting of organic hydroxy acids and lactones having from 2 through 5 carbon atoms at a temperature ranging from about 110° C. to about 180° C. and in the presence of a catalyst.

3. A polymerizable blend according to claim 1 wherein (1) and (c) are reacted at a temperature ranging from about 150° C. to about 200° C. until the acid value ranges from about 60 to about 80.

4. A polymerizable blend according to claim 1 wherein a monocarboxylic acid was used in addition to (a) in the formation of the polyester resin a polycarboxylic anhydride.

5. A polymerizable blend according to claim 1 wherein (a) includes a monocarboxylic acid.

6. A polymerizable blend according to claim 2 wherein (1) is selected from the group consisting of diethyl ethanephosphonate and dimethyl methanephosphonate.

7. A polymerizable blend according to claim 2 wherein the organic hydroxy acid is glycolic acid.

8. A polymerizable blend according to claim 2 wherein the lactone is beta-propiolactone.

9. A polymerizable blend according to claim 2 wherein the temperature of reaction between (1) and (2) is about 175° C .

10. A polymerizable blend according to claim 2 wherein said catalyst is a metal oxide catalyst selected from the group consisting of lead oxide, dibutyltin oxide, dibutyltin acetate, zinc oxide, calcium oxide and antimony oxide.

11. A polymerizable blend according to claim 10 wherein the catalyst includes zinc acetate.

12. A polymerizable blend according to claim 3 wherein the reaction between (1) and (c) takes place at a temperature of about 190° C.

13. A polymerizable blend according to claim 1 wherein (2) is a member of the group consisting of styrene, methyl methacrylate and vinyltoluene and mixtures thereof.

References Cited
UNITED STATES PATENTS 3,150,208  9/1964  Carson et al. ——————— 260—862

OTHER REFERENCES

Spasskii et al.: Plasticheskie Massy 1965 (2), 13–15.
Kodolov et al.: Tr. Inst. Khim. Akad Navy SSSR, Ural. Fihal No. 13, 75–83 (1966).

MELVIN GOLDSTEIN, Primary Examiner

U.S. Cl. X.R.

260—40 R, 75 P, 75 UA, 870